US006635842B2

(12) United States Patent
Goodwin

(10) Patent No.: US 6,635,842 B2
(45) Date of Patent: Oct. 21, 2003

(54) ELECTRIC ARC EQUIPMENT

(75) Inventor: David E Goodwin, Bramcote (GB)

(73) Assignee: Goodwin Air Plasma Limited (GB)

( * ) Notice: Subject to any disclaimer, the term of this patent is extended or adjusted under 35 U.S.C. 154(b) by 0 days.

(21) Appl. No.: 09/943,728

(22) Filed: Aug. 30, 2001

(65) Prior Publication Data

US 2002/0046988 A1 Apr. 25, 2002

(30) Foreign Application Priority Data

Sep. 1, 2000 (GB) ............................................ 0021401

(51) Int. Cl.[7] .................................................. B23K 9/00
(52) U.S. Cl. ......................................... 219/72; 219/136
(58) Field of Search ............................ 219/72, 74, 75, 219/130.4, 136, 137.2, 137.31

(56) References Cited

U.S. PATENT DOCUMENTS 3,284,609 A * 11/1966 Allen et al. .............. 219/130.4
3,431,390 A * 3/1969 Manz .......................... 219/75
4,554,432 A * 11/1985 Raloff ......................... 219/74
4,654,500 A * 3/1987 Stiles et al. ................... 219/72
4,731,518 A * 3/1988 Parmelee et al. ...... 219/137.31
6,137,079 A * 10/2000 Vincent et al. .......... 219/130.4

FOREIGN PATENT DOCUMENTS

DE 3711989 * 10/1988 ............. 219/130.4
JP 39556 2/1993
JP 138051 5/2001
JP 246474 9/2001

* cited by examiner

*Primary Examiner*—Clifford C. Shaw
(74) *Attorney, Agent, or Firm*—Trexler, Bushnell, Giangiorgi, Blackstone & Marr, Ltd.

(57) ABSTRACT

The invention relates to electric arc processes particularly for underwater use. Electric arc processes effected under water ordinarily operate at a voltage of 20 or 30 volts, with an open circuit of e.g. 50 volts, and are at a level that does not pose a serious risk to the diver. Such as plasma arc cutting has typical voltages of 100–200 volts, and an open circuit voltage of 200–400 volts, and can put a diver at considerable risk of electric shocks at a level that can be life threatening. The object of the invention is to avoid such risks, an objective met by electric arc equipment comprising an earthed safety electrode strategically positioned close to the torch of the electric arc equipment, to create the closest earth to which current could flow, but without the striking of an arc between a torch electrode and the earthed safety electrode.

5 Claims, 3 Drawing Sheets

ELECTRIC ARC EQUIPMENT

BACKGROUND

This invention relates to electric arc processes, and is particularly, but not necessarily exclusively, concerned with such processes as are used underwater.

Various electric arc processes are used underwater, by divers, mainly for welding and cutting. Most required the application of an open circuit voltage somewhat higher than the operating arc voltage. Thus a typical welding arc voltage of, say, 20 or 30, volts may use a supply with an open circuit voltage of 50 volts or more.

A code of practice exists which specifies that the maximum exposed voltage that can be used by divers in this situation is 30 volts. It then allows that this may not be practical and therefore so-called safe methods of working have to be used In practice divers who use this equipment are accustomed to experiencing electric shocks, but as they are, by experience unpleasant rather than life threatening, they are tolerated as a part of the process.

Plasma arc cutting, with typical arc voltages in the range 100–200 volts and open circuit voltages of 200–400 volts have not generally been used by divers underwater as those levels of voltage are more likely to prove life threatening. Because of the conductive nature of water there are many potential paths for currents to flow through the water and a divers body, and it is difficult to distinguish between a current which is flowing safely, and one which is likely to be dangerous.

In general terms most arc processes require two electrodes, one of which is often the workpiece, and the other usually contained within an item called a torch or electrode holder (hereinafter called “torch”). In order to produce an arc underwater a gas must be supplied to it, or it must be produced “in situ”—e.g. by creating steam, or by the effect of heat on the electrode material. The resulting ionised gas in the arc is highly conductive compared to water.

Usually the workpiece is connected to the other side of the arc power supply and so forms the other electrode (transferred arc processes). Often in situations above water this is also connected to earth for safety reasons. In the situation underwater the workpiece can frequently be considered “the earth” since it is likely to influence the electrical potentials experienced in the water near to it, and to which a diver might be exposed.

There could be situations where different floating objects and the sea bed could be at different potentials and thus the “earth” referred to is a relative one, not “absolute”.

There is also the situation of the non-transferred arc process, in which the torch contains both electrodes. In this situation it is likely that the workpiece will still be considered as earth in that it is likely to influence the potential in the water nearby. It is often the case, in plasma cutting processes, for the arc to be initiated in non-transferred mode (pilot arc) but for the cutting to take place in transferred mode.

With normal arc welding processes used underwater the most dangerous situation is probably when the supply is applied to the torch, but an arc is not struck. In this situation the applied voltage is generally at its highest, and the torch can be positioned away from the workpiece (earth). As is illustrated schematically in FIG. 1 of the accompanying drawings this opens up the possibility of exposing the diver directly to the open circuit voltage or to a part of it should the diver accidentally come into contact with the workpiece or be positioned between the torch and the workpiece.

OBJECT AND SUMMARY

The situation with non-transferred process is similar in that the non-transferred arc in the torch can impart a potential to the surrounding water, with respect to the “earth”. As is shown schematically in FIG. 2 of the accompanying drawings, this can put at risk a diver in the water between the torch and the workpiece.

The object of the present invention is to provide for the safe operation of plasma arc processes underwater, or any other process where voltage must be applied in a conductive medium and hence could give rise to the electric shocking of an operative.

According to the present invention, underwater electric arc equipment in which an electric arc is struck as between a primary electrode and a workpiece, through the intervening conductive medium of water comprises an earthed safety electrode positioned in relation to the primary electrode of the equipment to create the electrically closest earth to which current could flow through the conductive material from the primary electrode without the striking of an arc between the primary electrode and the earthed safety electrode.

In a preferred form of construction, the earthed safety electrode may be an annular ring or cylinder, concentrically positioned in relation to the torch, and whereby an arc struck between a torch electrode and a workpiece, passes through the annular earthed electrode.

Desirably, a torch body is provided to house the primary electrode and is either insulated or insulated and fitted with an earthed enclosure. In many cases the earth torch body may form sufficient of a safety electrode even if it does not obviously enclose the arc. However, the closer the safety electrode is to the point at which potentials are exposed to the water, the less likely it is that potentials will be experienced in the water outside the region of the torch. Thus the form of the safety electrode is not material to this invention, but rather its position in relation to the primary electrode and the arc (or other similar process), and to the diver and the workpiece.

BRIEF DESCRIPTION OF THE DRAWINGS

One embodiment of the invention will now be described with reference to the accompanying drawings in which.

DETAILED DESCRIPTION

Figure 3:
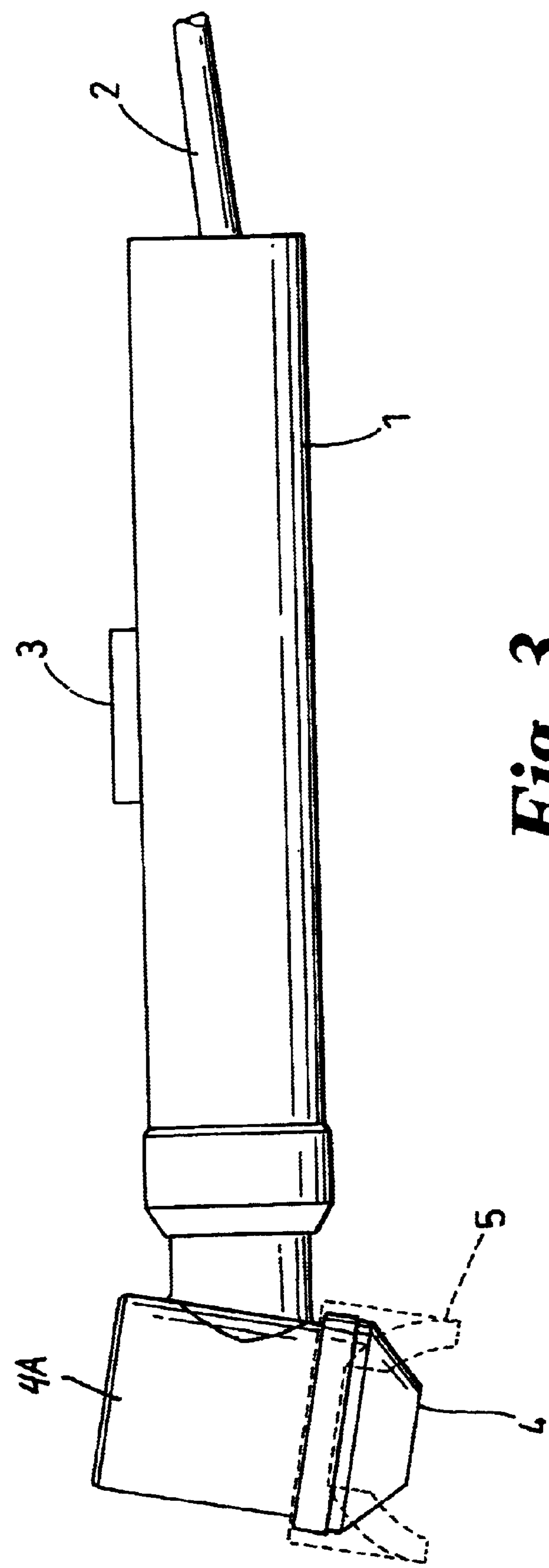
FIG. 3 is a side elevation of a torch illustrating the presence of a safety electrode.

In FIG. 3 is illustrated electric arc equipment, with a handle 1 from which extends an umbilical cord 2 for connection to a source of electrical supply. On the handle 1 is a switch 3, and a nozzle 4 on a torch body 4A containing a primary electrode from which will emerge an arc struck between the electrode within the torch body 4A and a workpiece 6. Surrounding the nozzle 4 is a ring 5 may be provided through which a struck arc will pass, the ring when provided serving as a safety electrode.

In FIG. 3 is illustrated a torch 1 with an umbilical cord 2 for connection to a source of electrical supply. On the torch is a switch 3, and a nozzle 4 from which will emerge an arc struck between an electrode within the body and a workpiece 6. Surrounding the nozzle 4 is a ring 5 through which a struck arc will pass, the ring serving as a safety electrode.

Figure 1:
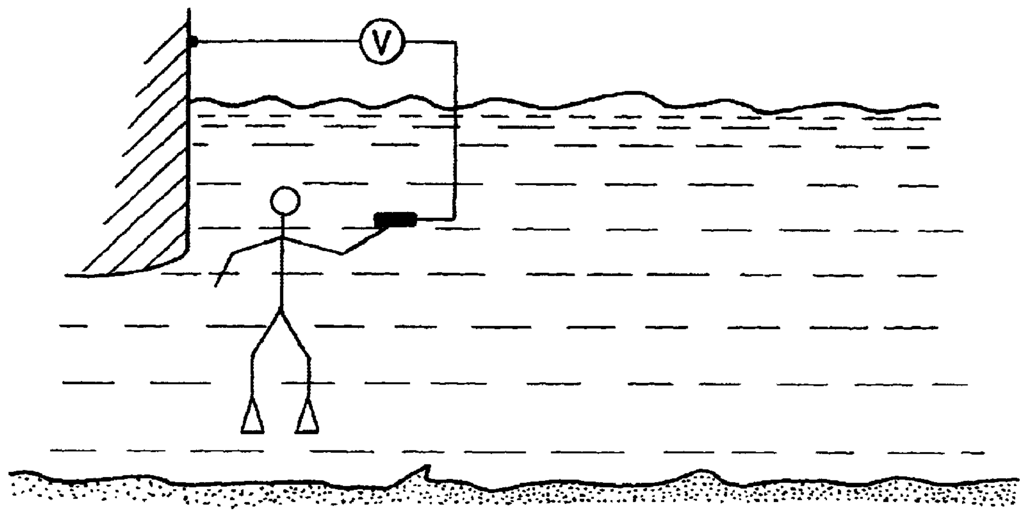
FIG. 1 relates to the prior art and shows a diver exposed to an open circuit voltage.
Figure 2:
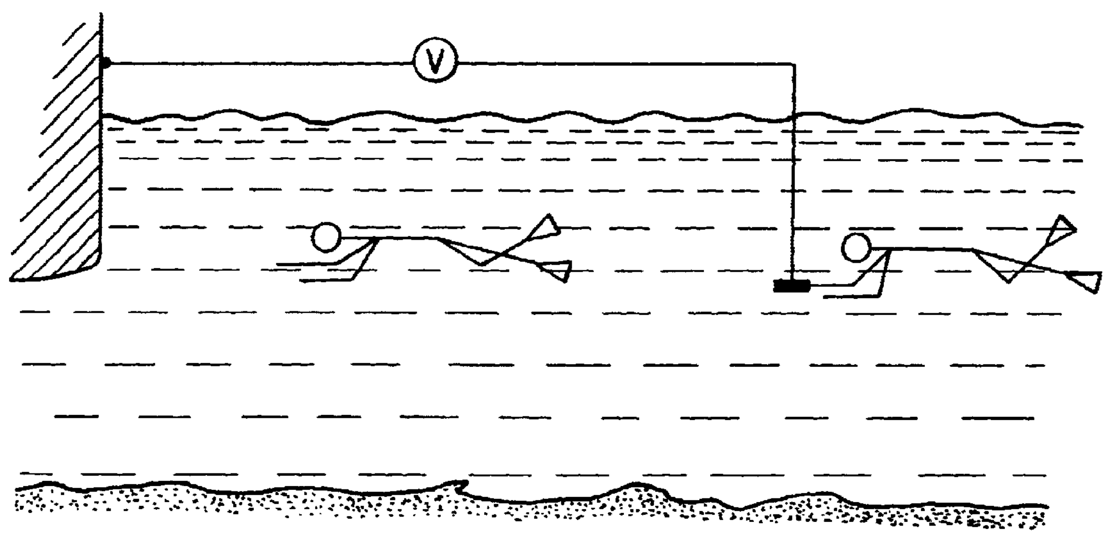
FIG. 2 relates to the prior art and shows a diver at risk in water between a torch and a workpiece.
Figure 4:
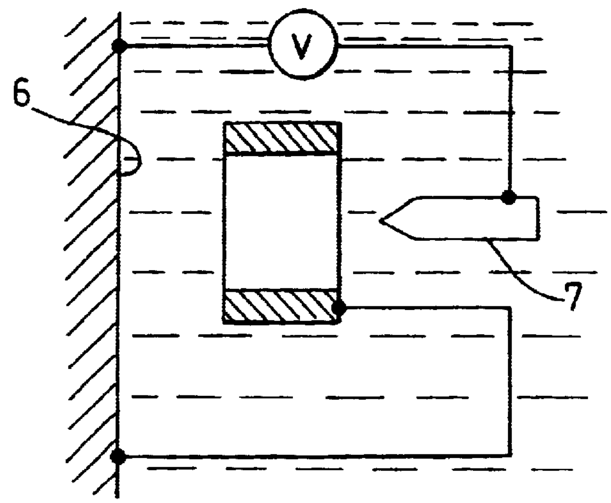
FIG. 4 is a schematic sectional view of an electrode, safety electrode and workpiece in an open circuit condition.
Figure 5:
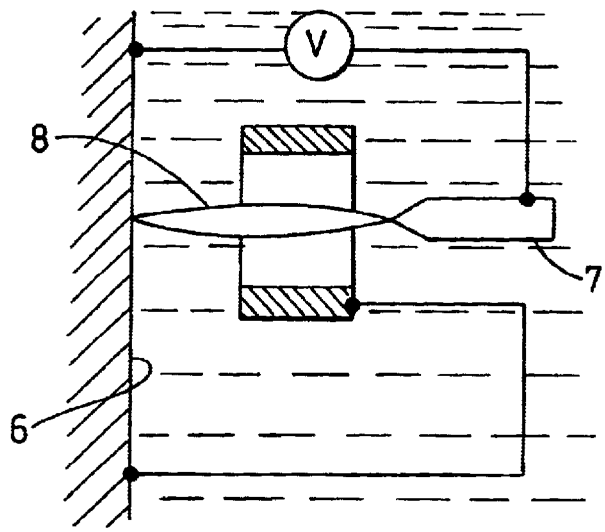
FIG. 5 corresponds to FIG. 4 but illustrates a transferred arc.
Figure 6:
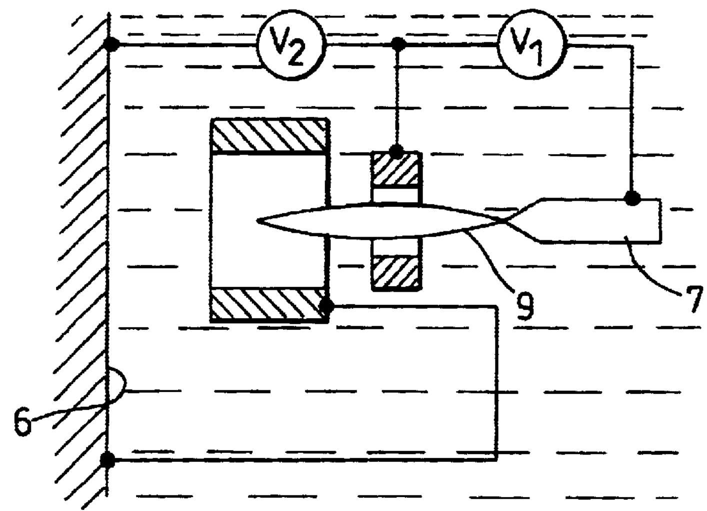
FIG. 6 corresponds to FIG. 4 but shows a non-transferred arc condition.

In common with conventional practice as is illustrated in FIGS. 1 and 2, a potential is created between the workpiece and the primary electrode, but, and as is illustrated schematically in FIGS. 4 to 6, the safety electrode 5 is connected to the same earth as is the power supply. As illustrated it is the workpiece 6.

Therefore, and in the circumstance where power is supplied to the torch, but an arc not struck as between an electrode 7 and the workpiece 6, i.e. an open circuit circumstance as is illustrated in FIG. 4, any potential imparted to the surrounding water is earthed through the safety electrode 5, substantially ensuring that a diver will not experience an electric shock should he/she be positioned between the torch and the workpiece.

Similarly, where there is a transferred arc 8 between the electrode 7 and the workpiece 6, any potential imparted to the surrounding water is earthed via the safety electrode 5. Also, and should a diver touch the workpiece whilst an arc is struck, the safety electrode 5 constitutes a preferred path to earth, again substantially ensuring that a diver is not subjected to dangerous shocks.

Perhaps the most dangerous circumstance facing a diver is where there is a non-transferred arc or pilot arc 9 as is illustrated in FIG. 6. Here again, any potential imparted to the surrounding water is effectively earthed, and even if the diver is holding or is in contact with the workpiece as the pilot arc is brought close enough to the workpiece for a transferred arc to be established, the safety electrode continues to be a preferred earth, safeguarding the diver against dangerous electric shocks.

Whilst the schematic drawings show the principle of connecting the arc electrode to the supply and safety electrode to the workpiece, it will be understood that all wiring can be carried by the umbilical 2 to the surface, and where the supply earth can be used for the safety electrodes.

What is claimed is:

1. Underwater electric arc equipment in which an electric arc is struck as between a primary electrode and a workpiece, through the intervening conductive medium of water comprising an earthed safety electrode positioned in relation to the primary electrode of the equipment to create the electrically closest earth to which current could flow through the conductive material from the primary electrode without the striking of an arc between the primary electrode and the safety electrode.

2. Underwater electric arc equipment as in claim 1, wherein the earthed safety electrode is an annular ring or cylinder exposed to the conductive medium of water and concentrically positioned in relation to the primary electrode, and whereby an arc struck through the conductive medium between the primary electrode and a workpiece passes through the earthed safety electrode in the form of a ring or cylinder.

3. Underwater electric arc equipment as in claim 1, wherein the primary electrode is located within an insulated torch body.

4. Underwater electric arc equipment as in claim 3, wherein the insulated torch body is connected to a handle, and is connected to earth, the torch body serving as the earthed safety electrode.

5. Underwater electric arc equipment as in claim 3, wherein the insulated torch body containing the primary electrode has attached thereto an earthed safety electrode.

* * * * *